United States Patent Office 3,400,147
Patented Sept. 3, 1968

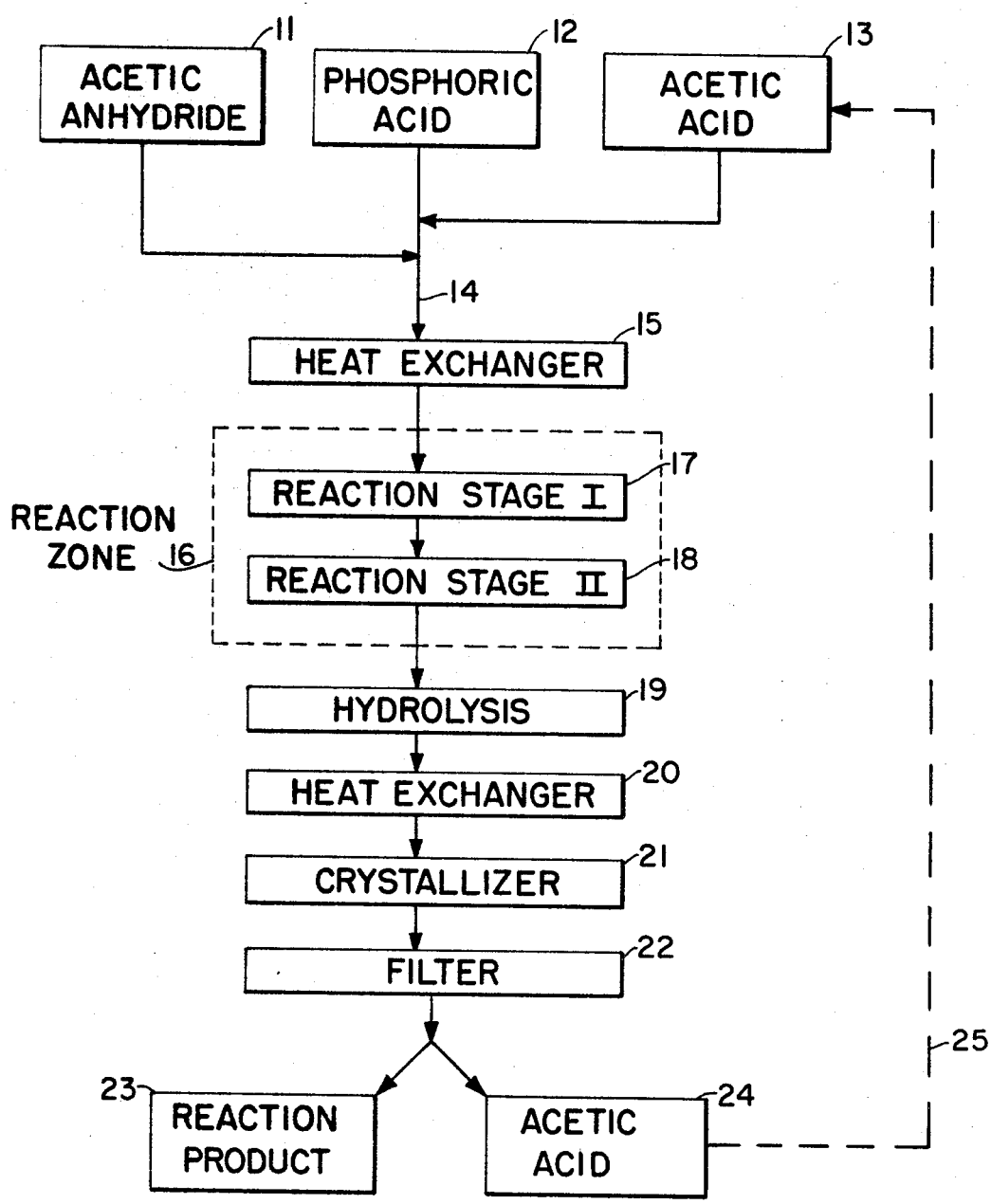

3,400,147
PROCESS FOR PREPARATION OF ORGANO-
PHOSPHOROUS COMPOUNDS
Lawrence Rogovin, Denis P. Brawn, and John N. Kalberg, Cincinnati, Ohio, assignors to The Procter & Gamble Company, Cincinnati, Ohio, a corporation of Ohio
Filed Mar. 30, 1965, Ser. No. 443,844
7 Claims. (Cl. 260—502.4)

ABSTRACT OF THE DISCLOSURE

A continuous process for preparation of ethane-1-hydroxy-1,1-diphosphonic acid which employs an acetic acid solvent for a reaction between phosphorous acid and acetic anhydride, the reaction temperature being in the range 150° F.–350° F.; said process including the steps of continuously preparing a reaction solution, continuously metering at least a sufficient amount of water into a stream of the reaction solution to hydrolyze substantially all of the acetyl-containing compounds in the reaction solution and recovering free ethane-1-hydroxy-1,1-diphosphonic acid.

---

This invention relates to a process for preparing organophosphorous compounds and more especially to a continuous process for preparing ethane-1-hydroxy-1,1-diphosphonic acid and salts thereof.

Ethane-1-hydroxy-1,1-diphosphonic acid,

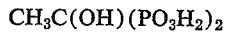

has the following structural formula:

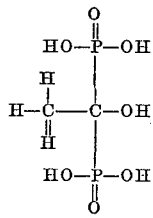

The acid and its water-soluble salts have excellent sequestering properties which make them useful in many applications where an efficient sequestrant and chelating agent is required. Among the many uses to which the compounds of the present invention can be put are removal of scale formation from boilers, heat exchangers, oil wells and piping associated with such equipment; as stabilizing agents for surface active materials such as soap and peroxy compounds such as hydrogen peroxide, perborates and persulfates; and as builders in detergent compositions as described and illustrated in U.S. Patent 3,159,581, dated Dec. 1, 1964. Generally, the compositions described herein can be used in any applications where it is desired to effectively complex polyvalent cations.

There are several reactions described in the literature which can be used to prepare diphosphonic acids such as ethane-1-hydroxy-1,1-diphosphonic acid. For example, Baeyer and Hofmann in 1897 described a reaction between phosphorous trichloride and acetic acid. These two reactants combine to produce phosphorous acid and acetyl chloride which, in turn, react to form the desired acid. Another known reaction involves a reaction between phosphorous acid and acetic acid anhydride. This latter reaction is referred to in such references as German Patents 1,072,346, dated Dec. 31, 1959; 1,082,235, dated Oct. 27, 1960; 1,107,207, dated Dec. 14, 1961 (U.S. Patent 3,122,417); 1,148,235, dated July 3, 1961; 1,148,551, dated Nov. 7, 1963; and 1,152,497, dated Aug. 8, 1963. However, all of the known processes pertain to and describe batch operations. No known continuous process for the preparation of ethane-1-hydroxy-1,1-diphosphonic acid has come to the attention of the present inventors. Each of the known batch reactions has the usual disadvantages of such small scale processes. They provide low yields of relatively impure products, poor conversion rates of starting phosphorous reagent to the desired acid, and they are relatively expensive and difficult to control.

One obstacle to the discovery of a continuous process is that the foregoing reactions involve extremely complex chemistry. The various phosphorous reagents react with acetylating agents to form many intermediates of unknown composition. Many of the reaction intermediates and by-products tend to precipitate out of the reaction mixture as insoluble materials. Since the mechanism for the reaction has never been fully understood, it has not been possible heretofore to provide an efficient continuous reaction process that would result in the formation of ethane-1-hydroxy-1,1-diphosphonic acid in high yields, good conversion rates and good purity. A review of the previous literature dealing with this reaction could easily lead one to conclude that a continuous process would be impractical and expensive.

FIGURE 1 is a drawing depicting the continuous flow pattern according to one embodiment of the present invention.

It is a primary object of the present invention to provide a highly efficient continuous process for preparing ethane-1-hydroxy-1,1-diphosphonic acid. Another object of the present invention is to provide a continuous process for preparing ethane-1-hydroxy-1,1-diphosphonic acid which, in addition to being highly efficient, has, as among its advantages, the very high conversion ratio of the phosphorous species to the desired diphosphonic acid, and high yields of the desired product in substantially pure form. A further object of the present invention is to provide a continuous process for preparing ethane-1-hydroxy-1,1-diphosphonic acid by a reaction between phosphorous acid and acetic anhydride which embodies the use of an acetic acid solvent for the reaction. These and other objects will become apparent from a careful reading of the following description of the present invention.

Accordingly, in its broadest terms, the present invention provides a continuous process for preparing ethane-1-hydroxy-1,1-diphosphonic acid which comprises essentially the steps of continuously preparing a reaction solution by mixing together phosphorous acid, acetic anhydride and acetic acid, continuously passing said reaction solution to a reaction zone and heating said reaction solution to a temperature in the range of from about 150° F. to about 350° F., continuously withdrawing a stream of reaction solution composed essentially of acetyl-containing compounds from said reaction zone, continuously metering water into said withdrawn stream of reaction solution to hydrolyze substantially all of said acetyl-containing compounds in said reaction solution, thereby continuously forming a mixture comprising essentially ethane-1-hydroxy-1,1-diphosphonic acid and acetic acid, and, thereafter, recovering said ethane-1-hydroxy-1,1-diphosphonic acid.

In terms of the drawing, the present invention embodies a continuous process for preparing an ethane-1-hydroxy-1,1-diphosphonic reaction product 23, which includes the steps of preparing a reaction solution comprising acetic anhydride 11, and phosphorous acid 12, dissolved in acetic acid 13. According to the drawing, the embodiment there presented calls for premixing the phosphorous acid with the acetic acid and introducing the acetic anhydride into a stream of said premixed solution. The reaction solution is then passed to a heat exchanger 15, where the reaction solution is heated to effect the reaction, then passing said reaction solution to a reaction zone 16, depicted in the drawing as consisting of a two-stage back-mix reaction system 17 and 18. While the drawing, as drawn, has the heat exchanger outside of reaction zone 16, this is simply one representation and the heat exchanger can, if desired, be considered part of the reaction zone since the acetic anhydride and the phosphorous acid begin to react immediately on contact. From the reaction zone, a stream of reaction solution is continuously withdrawn and passed to a hydrolyzer where a hydrolysis step occurs 19. The hydrolyzed mixture is continuously passed to a heat exchanger 20, where cooling occurs and from here the cooled reaction solution is continuously fed to a crystallizer 21, in which the ethane-1-hydroxy-1,1-diphosphonic acid crystallizes. The reaction solution is thereafter continuously fed to a filter from which the crystallized ethane-1-hydroxy-1,1-diphosphonic acid reaction product 23, is continuously recovered and an acetic acid filtrate 24, is also recovered and recycled via line 25 back to the source of acetic acid starting material. Modifications of the continuous process represented in the drawing will become apparent from the description of the present invention presented below.

The discovery of the present invention which makes possible the present continuous process is the use of the acetic acid solvent. Not only are the initial reagents soluble in the acetic acid, but it has been discovered that the reaction intermediates are also sufficiently soluble to allow for a free and continuous passage of the reaction solution between a series of reaction stages. All yield and conversion figures mentioned herein are based on the phosphorus contained in the starting reactants.

The acetic acid, when used at the prescribed proportions, reduces the viscosity of the reaction solution very substantially. This allows for substantially greater molecular motion by the reactants and also allows the solution to be more readily handled throughout the continuous process within the specified temperature range.

The discovery that acetic acid can be employed as a solvent for the reaction system offers not only the surprising advantage of a continuous process for preparing EHDP in substantially pure form, at high conversion rates, but it accomplishes this without introducing into the reaction system a material that can be regarded as foreign to the overall reaction system. It will become evident from the following discussion that the starting acetic anhydride reagent brings into the reaction system acetyl groups which conform to that of the basic acetic acid solvent employed. Thus, when in the present continuous process the acetyl-containing reaction product comprising excess acetic anhydride and acetylated ethane-1-hydroxy-1,1-diphosphonic acid is hydrolyzed by the addition of water, excess acetic anhydride along with any acetyl-containing intermediates formed as by-products during the reaction are converted to acetic acid which can be recovered. A portion of the recovered acetic acid can be recycled to the initial reaction solution and, if desired, a portion of it can be used to prepare acetic anhydride which is one of the starting reactants.

In this way, the reaction, as well as the overall process, becomes somewhat self-sustaining in that the acetic acid solvent used in the process is actually prepared as a by-product of the basic reaction itself. The economic savings offered by this aspect of the invention are substantial and make it peculiarly attractive for large scale operations.

The reaction solution containing phosphorous acid and acetic anhydride dissolved in acetic acid can be continuously prepared by mixing the reagents in any order. Thus, for instance, the phosphorous acid can be added to acetic anhydride, and this mixture then dissolved in acetic acid. Alternatively, either the phosphorous acid or the acetic anhydride can be premixed with the acetic acid followed by addition of the other reactant. While any of the above procedures are operable, a preferred embodiment of the present invention provides for preparing an acetic acid reaction solution of phosphorous acid dissolved in acetic acid, and then continuously metering acetic anhydride in proper proportion to said premixed solution of phosphorous acid and acetic acid. This sequence of mixing makes it substantially easier to handle the phosphorous acid which tends to be highly corrosive in free acid form.

The basic reaction between acetic anhydride and phosphorous acid according to the present invention requires the use of a molar excess of the acetic anhydride reactant. The molar proportion of acetic anhydride to phosphorous acid can be in the range of from about 1.1:1 to about 2:1, respectively. It is preferred to operate in the molar proportion of acetic anhydride to phosphorous acid of from 1.3:1 to 1.5:1, respectively.

According to the present invention, the reaction should be conducted under substantially anhydrous conditions. For this reason, the reactants should be substantially anhydrous also. Any water present during the reaction will tend to decompose the starting acetic anhydride reactant to acetic acide and thus interfere with the desired course of the reaction. Glacial acetic acid as obtained commercially contains a very slight amount of water, e.g., about .2% to .3% but this low amount of water is permissible. The phosphorous acid should also be in substantially anhydrous form although a very low amount of water in the commercial grade acid is permissible.

The amount of acetic acid employed as the solvent in the present continuous process is an important consideration. It has been found desirable to operate the continuous process using a level of acetic acid which corresponds to a molar proportion of acetic acid to phosphorous acide starting material in the range of from about .1:1 to about 13:1 and preferably from about .9:1 to 2:1. If less acetic acid is employed than an amount which corresponds to a molar ratio of .1:1 based on the phosphorous acid, the reaction system lacks the necessary fluidity to render a continuous process. If the molar proportion of 13:1 is exceeded, the reaction system as a continuous process is economically and practically unfeasible.

In the preferred embodiment, wherein the phosphorous acid is premixed with the acetic acid, the mixing should occur within a temperature range of from about 56° F. to the melting point of the phosphorous acid, i.e., about 165° F. Lower temperatures should not be used because the acetic acid has a freezing point at that range. Higher temperature can be used but with no practical advantage. Preferably, the phosphorous acid and the acetic acid should be premixed at a temperature of from 90° F. to about 120° F. The acetic anhydride can then be added to the premixed solution of phosphorous acid and acetic acid at room temperature.

The reaction solution containing the acetic anhydride, phosphorous acid and acetic acid is then heated to a temperature in the range of from about 150° F. to about 350° F. and preferably within a range of from 225° F. to 325° F. in order to effect the reaction. The heating can most efficiently be performed in the present continuous process by means of a heat exchanger, but any other convenient means can be used such as heating coils, etc.

In one embodiment of the present invention, the reaction is conducted in a reaction zone defined by a tubular reactor which provides for an adequate time period for the reaction to go to completion. In this type of a reaction system, the reaction solution is passed into a tubular reactor such a heated coil, and the reaction progresses as the reactants are mixed by the flow pattern through the coil. A reaction system of this type can be thought of as a plug-flow type of reaction system in which the reaction solution is continuously passed through the tubular reactor, and the reaction proceeds and is completed prior to being continuously discharged therefrom. The size of the equipment necessary to operate the present invention in this type of a system can readily be designed to handle the expected capacity of the system.

It may also be necessary in a reaction zone of this type to provide additional mixing means to insure adequate reaction and conversion rates. This can be performed readily, for example, by positioning restricted zones or orifices within the tubular reactor or other equivalent means.

It will be appreciated that the reaction between the acetic anhydride and the phosphorous acid begins immediately on contact of the reactants, e.g., at the inlet end to the tubular reactor, or earlier if a separate heating step is used. The reaction can figuratively be thought of as progressing in continuous stages or increments as the reaction solution passes along through the reaction zone defined by the tubular reactor.

According to another and preferred ebodiment of the present invention, the reaction solution is passed to a reaction zone consisting of a plurality of separate reaction stages. In other words, the reaction is carried out in at least two or more stages. It has been discovered that when the reaction is run in a plurality of stages, the overall yield and conversion rates are substantially improved. In contrast, when the reaction is run to completion in a single confined stage, the reaction requires inordinately long times. Even after protracted reaction periods, however, it has not been possible heretofore to provide in a batch reaction system conversion rates and yields of ethane-1-hydroxy-1,1-diphosphonic acid on the order of 98% to 100%. Batch processes are too slow and expensive and not capable of being used for large-scale operations.

A back-mixing reaction system is illustrative of this preferred embodiment. The terms "back-mixing" or "back-mix," as used herein, describe a constant volume system comprised of a plurality of reaction stages which together define a continuous system in which the amount of reaction mixture continuously being withdrawn from one reaction stage is equal to the amount of reaction mixture being continuously added into that stage. Moreover, in a continuous reaction zone composed of three separate back-mix reaction stages there is an exact materials balance maintained between the amount of reaction solution being passed into the first stage and the amount being withdrawn from the third or last stage. The same principle applies to any back-mix reaction zone regardless of the specific number of stages connected in series. Each stage can be defined as a separate reaction vessel or as one of a group of compartments in a single reactor, which compartments are joined in series.

In this type of a back-mix reaction system, the average residence time within each reaction stage is a fractional part of the total residence time within the overall reaction zone. For example, in a two-stage reaction zone in which both stages are equal in size, the average residence time within each zone would be one-half of the total residence time. In a three-stage reaction zone, each stage being equal in size, the average residence time within each zone would be one-third of the total residence time. It is important to note that these statements apply to average residence times since account must be taken of such factors as stirring and mixing of the reaction solutions within each zone. The back-mix reactors in each case need not be the same size; they can vary in size, as desired.

According to the present invention, the total average residence time within the reaction zone, regardless of which embodiment is used, should be on the order of from about 2 minutes to about 10 hours, and preferably from 5 minutes to 3 hours. For any given situation these figures will be partially dependent upon the size of the equipment being used and the scale of the overall operation.

A back-mixing system, as just described, offers the desirable feature of approaching almost infinite mixing in each back-mix stage. Within the scope of the present invention, best results are obtained by using the greatest number of back-mix stages for any given total residence time in the reaction zone. In other words, for a given average residence time of 60 minutes, three back-mix stages, each averaging a residence time of 20 minutes, will afford higher conversion rates than two back-mix stages, each averaging a residence time of 30 minutes.

The temperature throughout the reaction zone should be maintained within a range of from about 150° F. to about 350° F. and preferably from 225° F. to about 325° F.

It is also important that the reaction solution be adequately stirred throughout the reaction zone. In a "back-mix" type of reaction system, each of the reaction stages can be equipped with its own stirring means. Other alternative mixing techniques can be used provided that the reaction solution is in a continuous state of agitation. If mixing is inadequate, the desired reaction rate is adversely affected and, in addition, undesirable by-products may be formed which will interfere with the maximum yield of the desired reaction products.

As mentioned above, a stream of reaction solution is continuously withdrawn from the reaction zone equal in amount to that being fed into the reaction zone. The reaction solution at this point in the process is comprised essentially of various acetylated forms of ethane-1-hydroxy-1,1-diphosphonate species, acetic acid, and excess acetic anhydride and perhaps minor amounts, e.g., less than 5 to 10% of other by-products such as acetylphosphonates, and the like.

The acetylated-diphosphonic acid reaction product is thought to have the following structural formula:

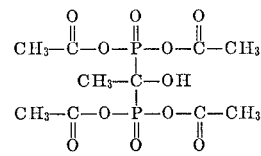

The formula shown depicts a fully acetylated compound in which all of the acid hydrogens have been replaced with acetyl groups. Actually the reaction product could be comprised of a mixture of compounds containing from 0, 1, 2, 3 or 4 such acetyl groups. The above formula is merely illustrative.

In order to convert all of the aforementioned compounds containing the acetyl groups into the corresponding free acid forms, there is continuously metered into the withdrawn stream of reaction solution an amount of water which is necessary to carry out the hydrolysis. As a result of this hydrolysis step, the reaction mixture contains the free form of ethane-1-hydroxy-1,1-diphosphonic acid, as well as acetic acid.

The amount of water added in the hydrolysis step represents another critical aspect of the present invention. It is important that at least the theoretical amount of water be used which is necessary to split off all of the acetyl groups in the reaction mixture and thereby convert all of the acetyl-containing compounds to free acids, i.e., free ethane-1-hydroxy-1,1-diphosphonic acid and free acetic acid. An excess over the theoretical amount also can be used; but for reasons given below, it is not generally done.

The preferred embodiment is to use just the theoretical amount of water necessary to hydrolyze all of the acetyl groups. The exact amount can be calculated for any set of molar proportions of the reactants by using the following formula:

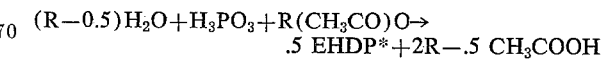

Wherein R represents the number of moles of acetic anhydride per mole of phosphorous acid used in the reaction. As R varies, the theoretical amount of water varies according to (R—.5) moles.

An illustration of an application of this formula wherein R+1.4 is as follows:

.9H$_2$O+H$_3$PO$_3$+1.4(CH$_3$CO)$_2$O→
.5 EHDP*+2.3 CH$_3$COOH

\* Ethane-1-hydroxy-1,1-diphosphonic acid.

The reason for the preference of operating with a theoretical amount of water or with a limited excess of water, for example, less than 200% excess, is that the desired diphosphonic acid is soluble in water and an excess of water, if present, may dissolve a portion of the diphosphonic acid, thus making recovery of the acid slightly more difficult. For instance, one effective way of separating and recovering the diphosphonic acid is by crystallizing it from the acetic acid. Any portion dissolved in excess water would be lost to this particular recovery procedure and would involve another step. In a preferred embodiment of the present invention any excess of water should be kept to a minimum in order to eliminate the additional need of separating it from that portion of the acetic acid which can be recycled back into the initial substantially anhydrous acetic anhydride-phosphorous acid reaction solution. As mentioned previously, the reaction between the acetic anhydride and the phosphorous acid should occur in a substantially anhydrous system. Any water present during the reaction will decompose the starting acetic anhydride reactant to acetic acid and thus interfere with the desired course of the reaction. For this reason, it is desirable that any acetic acid portion which is going to be recycled back to the reaction zone, should contain as little water as possible and preferably be substantially anhydrous.

A slight excess of water in the hydrolysis step such as that introduced into the system via the reactants, e.g., commercial grade glacial acetic acid usually contains amounts of water up to about .2% to .3%, can be tolerated by the reaction system.

On the other hand, the use of less than the theoretical amount of water in the hydrolysis step should be avoided for this results in a direct loss of desired reaction products, and thus the efficiency of the continuous reaction process is impaired.

The temperature during the hydrolysis step tends to rise due to the heat of reaction which occurs upon the water addition. Care should be taken to insure that the temperature of the hydrolyzed reaction solution does not rise above about 350° F. Above this temperature, the products of reaction tend to decompose with the attendant formation of undesired by-products and consequent loss of desired product. It is preferred to have the temperature in the range set previously for the reaction in the reaction zone, i.e., 150° F. to 350° F.

Ethane-1-hydroxy-1,1-diphosphonic acid is essentially insoluble in acetic acid. This fact greatly facilitates separation and recovery of the desired diphosphonic acid from the hydrolyzed reaction solution which, as mentioned, consists essentially of a mixture of these two acids. The hydrolyzed reaction solution is cooled to a temperature within the range of from about 56° F. and about 140° F., and preferably from about 70° F. to about 120° F., and agitating the solution. This causes the diphosphonic acid to crystallize and separate out. The pure ethane-1-hydroxy-1,1-diphosphonic acid is then obtained by filtering the resulting reaction solution. The acetic acid filtrate, as mentioned previously, can be recycled to the initial reaction solution and a portion of its can be used to make acetic anhydride by known methods.

Also as mentioned earlier, the presence of water in the mixture of ethane-1-hydroxy-1,1-diphosphonic acid and acetic acid causes the former acid to dissolve. The greater the amount of water present, the greater the amount of dissolved diphosphonic acid and the less diphosphonic acid that will crystallize out. For this reason, it is preferred to use the theoretical amount of water in the hydrolysis step.

The hydrolysis step and the cooling steps can be reversed in a modified continuous process so that as the stream of reaction solution is withdrawn from the reaction zone, it first can be cooled directly and then hydrolyzed by water treatment.

Regardless of the hydrolysis-cooling sequence, crystallization of the ethane-1-hydroxy-1,1-diphosphonic acid as has been noted is essentially out of the acetic acid phase.

As the crystals begin to form, they tend to separate out. This crystallization step is facilitated by cooling and agitating the acid mixture. Moreover, the crystallization can be substantially accelerated by seeding the acid mixture with the addition of ethane-1-hydroxy-1,1-diphosphonic acid crystals.

The viscosity of the reaction mixture is also a significant factor which affects the rate of crystallization of the ethane-1-hydroxy-1,1-diphosphonic acid crystals. A hydrolyzed reaction mixture without an acetic solvent has a viscosity of about 8000 centipoises at about 180° F. While crystallization can occur under such conditions, it does so fairly slowly. Use of acetic acid as a solvent in the system in the manner taught by the present invention reduces the viscosity of the hydrolyzed reaction mixture down to only 90 centipoises at 80° F. The lower viscosity provides for better stirring of the solution and greatly improved nucleating and crystallizing conditions.

The solution containing the ethane-1-hydroxy-1,1-diphosphonic acid crystals can be filtered in any known manner to recover the free acid. This can be done either in a continuous or batch manner, depending on such things, for example, as the size of the operation. The separated acid can then either be dried and prepared for use as the free acid or it can be neutralized to form any desired salts thereof. Conversion to the salts can be performed also in any well known manner.

In the event that temperatures in excess of the atmospheric boiling point of the reaction mixture are employed in the reaction system, such as either in the reaction zone or in the hydrolysis step, the continuous process should be maintained under back pressure in excess of the vapor pressure of the reaction mixture. The reason for this is to prevent vaporization of the reaction solution and separation of acetic acid and acetic anhydride from the reaction mixture. At temperatures less than the atmospheric boiling point of the reaction mixture, the requirement for back pressure does not exist. It can be noted that in place of operating under pressure in some circumstances, it is possible alternatively to reflux any boiling vapors. This alternative procedure, however, requires special equipment and procedures; and for these and other economic reasons, this alternative procedure is less preferred.

The following examples illustrate the invention in specific details. The procedures followed in the examples are merely illustrative and are not in any way intended to limit the proper scope of the present invention as fully described elsewhere in the preceding description.

EXAMPLE I

Phosphorous acid was premixed with acetic acid to form a 50 weight percent solution of phosphorous acid dissolved in acetic acid. The acids were mixed on a molar basis of 1.36:1, acetic acid to phosphorous acid, and this corresponded on a mole percentage basis to 57.6% acetic acid and 42.4% phosphorous acid. Acetic anhydride was continuously metered into a stream of the phosphorous acid-acetic acid mixture to form the reaction solution. The acetic anhydride was metered into the acid mixture at a mole ratio of 1.33 moles of acetic anhydride per mole of phosphorous acid. The metering rates were 18.5 pounds per hour of the phosphorous acid/acetic acid premixed solution and 15.1 pounds per hour acetic anhydride. The reaction solution was continuously passed through a heat exchanger where it was heated to 190° F. then it was continuously fed into a two stage back-mix reaction zone where due to the heat of reaction the temperature rose to 275° F. The average residence in the reaction zone was 27 minutes. The reaction zone consisted of two back-mix reactors each having a capacity of 7.5 pounds of the reaction solution. A stream of reaction solution was continuously withdrawn from the second reactor and continuously mixed with a stream of water which was being metered at a rate of 2 pounds per hour. This amount of water corresponded to 18% excess over the theoretical amount necessary to hydrolyze all of the acetyl-containing compounds in the reaction solution to free acids. The hydrolyzed solution was continuously passed through a heat exchanger and cooled to room temperature after which the solution was continuously passed to a crystallizer where, with agitation, the ethane-1-hydroxy-1,1-diphosphonic acid crystallized. The slurry was then filtered and the crystals were recovered and dried. Analysis of the product showed a conversion rate of phosphorous acid to ethane-1-hydroxy-1,1-diphosphonic acid of 86%.

EXAMPLE II

Phosphorous acid was premixed with acetic acid to form a 50 weight percent solution of phosphorous acid dissolved in acetic acid. The acids were mixed on a molar basis of 1.36:1 acetic acid to phosphorous acid, and this corresponded on a mole percentage basis to 57.6% acetic acid and 42.4% phosphorous acid. Acetic anhydride was continuously metered into a stream of phosphorous acid-acetic acid mixture to form the reaction solution. The acetic anhydride was metered into the acid mixture at a mole ratio of 1.45 moles of acetic anhydride per mole of phosphorous acid. The metering rates were 23.2 pounds per hour of the phosphorous acid/acetic acid premixed solution and 20.6 pounds per hour of acetic anhydride. The reaction solution was continuously passed through a heat exchanger where it was heated to 180° F., then it was continuously fed into a two-stage back-mix reaction zone, where due to the heat of reaction, the temperature rose to 275° F. The average residence time in the reaction zone was 21 minutes. The reaction zone consisted of two one-gallon back-mix reactors. A stream of reaction solution was continuously withdrawn from the second reactor and continuously mixed with a stream of water which was metered at a rate of 35 pounds per hour. This amount of water corresponded to 45% excess over the theoretical amount necessary to hydrolyze all of the acetyl-containing compounds in the reaction solution to free acids. The hydrolyzed solution was continuously passed through a heat exchanger and cooled to room temperature after which the solution was continuously passed to a crystallizer, where, with agitation, the ethane-1-hydroxy-1,1-diphosphonic acid crystallized. The slurry was then filtered and the crystals were recovered and dried. Analysis of the product showed a conversion rate of phosphorous acid to ethane-1-hydroxy-1,1-diphosphonic acid of 93.4%.

EXAMPLE III

Phosphorous acid and acetic acid were premixed according to the procedure described in Example I. Acetic anhydride was continuously metered into a stream of the phosphorous acid-acetic acid mixture at a mole ratio of 1.4 moles of acetic anhydride per mole of phosphorous acid to form the reaction solution. The metering rates were 9.4 pounds per hour of the phosphorous acid/acetic acid premixed solution and 8.3 pounds per hour of acetic anhydride. The reaction solution was continuously passed through a heat exchanger where it was heated to 190° F., then it was continuously fed into a two-stage back-mix reaction zone where due to the heat of reaction, the temperature rose to 275° F. The average residence time in the reaction zone was 53 minutes. The reaction zone consisted of two back-mix reactors, each having a capacity for 7.5 pounds of the reaction solution. A stream of reaction solution was continuously withdrawn from the second reactor and continuously mixed with a stream of water which was metered at a rate of 2 pounds per hour. This amount of water corresponded to 115% excess over the theoretical amount necessary to hydrolyze all of the acetyl-containing compounds in the reaction solution to free acids. The hydrolyzed solution was continuously treated in the same manner described in Example I and the ethane-1-hydroxy-1,1-diphosphonic acid reaction product was recovered at a conversion rate, based on phosphorous acid, of 96%.

EXAMPLE IV

The procedure outlined in Example I was repeated using the following specifications, conditions and results. The phosphorous acid-acetic acid solution was prepared using the same proportions as Example I. The molar ratio of acetic anhydride to phosphorous acid, respectively, was 1.62:1. The metering rates were 22.2 pounds per hour of the acid mix and 22.6 pounds per hour of the acetic anhydride. In the heat exchanger the reaction solution was heated to 200° F., which later raised to 275° F. in the reaction zone due to the heat of reaction. Again, the same two-stage back-mix reaction system described in Example I was used with an average residence time of 1.1 hours. In the hydrolysis step, water was continuously metered at a rate of 4.5 pounds per hour into a stream of reaction solution continuously being withdrawn from the reaction zone. The amount of water used was 65% excess over the theoretical amount. The separation and recovery of ethane-1-hydroxy-1,1-diphosphonic acid performed in the manner of Example I and analysis revealed a conversion rate of 97.9%.

EXAMPLE V

The procedure outlined in Example I was again repeated using the following detailed specification, conditions and results. The acetic acid-phosphorous acid solution was prepared using the molar proportions of 1.22:1 respectively. This ratio corresponded to a mole percentage basis of 54.8% acetic acid and 45.2% phosphorous acid. The metering rates were 64.8 pounds per hour of the acid mixture and 62.1 pounds per hour of the acetic anhydride reactant. The molar ratio of acetic anhydride to phosphorous acid was 1.6:1, respectively. The heat exchanger heated the reaction stream to 200° F. which continued to rise to 300° F. due to the heat of reaction. The reaction zone was a three stage reaction zone consisting of three back-mix reactors in series each having a capacity of 7.5 pounds, 7.5 pounds and 175 pounds respectively. The total residence time was 1.1 hours. Water in the amount of 60% excess over theoretical was metered into the stream of the reaction solution being continuously withdrawn from the reaction zone. The water metering rate was 12.5 pounds per hour. The conversion figure on a separated and recovered diphosphonic acid reaction product was 99.8%.

EXAMPLE VI

The procedure outlined in Example I was again repeated using the following detailed specifications, conditions and results. The acetic acid-phosphorous acid solution was prepared using the molar proportions of 1.82:1, respectively. This ratio corresponded to a mole percentage basis of 64.5% acetic acid and 35.5% phosphorous acid. The metering rates were 45 pounds per hour of the acid mix and 46.8 pounds per hour of acetic anhydride reactant. The molar ratio of the acetic anhydride to phosphorous acid was 1.44:1, respectively. The reaction solution was heated to 180° F. and, due to heat of reaction, rose to a level of 300° F. The reaction system was identical to the one in Example V but was run with a longer average residence time of 1.4 hours. Water in the amount of 29% excess over theoretical was metered into the stream of reaction solution being continuously withdrawn from the reaction zone. The water metering rate was 6 pounds per hour. The conversion figure on a separated and recovered diphosphonic acid reaction product was 99.7%.

It will be apparent to those skilled in the art that certain changes may be made in the above process, and different embodiments of the invention can be made without departing from the scope thereof. It is intended that all matter contained in the above description and illustrated in the foregoing examples shall be interpreted as being illustrative and not in a limiting sense.

Having described our invention, what we claim as new and desire to secure by Letters Patent is:

1. A continuous process for preparing ethane-1-hydroxy-1,1-diphosphonic acid which consists essentially of the steps of:
   (1) continuously preparing a substantially anhydrous reaction solution by mixing together phosphorous acid, acetic anhydride, and acetic acid, the molar proportion of said acetic anhydride to said phosphorous acid being in the range of from about 1.1:1 to about 2:1; the molar proportion of said acetic acid to said phosphorous acid being in the range of from about .9:1 to about 13:1;
   (2) continuously passing said reaction solution to a reaction zone and heating said reaction solution to a temperature in the range of from about 150° F. to about 350° F. to effect a reaction between said acetic anhydride and said phosphorous acid, the average residence time within said reaction zone being from about 2 minutes to about 10 hours;
   (3) continuously withdrawing a stream of reaction solution composed essentially of acetyl-containing compounds from said reaction zone;
   (4) continuously metering a critical amount of water into said withdrawn stream of said reaction solution, said critical amount of water being from that stoichiometrically required to 200% excess water over that stoichiometrically required to hydrolyze substantially all of said acetyl-containing compounds in said reaction solution thereby continuously forming a hydrolyzed mixture consisting essentially of ethane-1-hydroxy-1,1-diphosphonic acid, acetic acid and said excess water; and
   (5) agitating and cooling said hydrolyzed mixture to a temperature in the range of from about 56° F. to about 140° F. to induce crystallization of said ethane-1-hydroxy-1,1-diphosphonic acid out of said mixture, and filtering and recovering said ethane-1-hydroxy-1,1-diphosphonic acid.

2. A continuous process according to claim 1 wherein the acetic acid filtrate obtained from the filtering step is recycled to the initial reaction solution.

3. A continuous process according to claim 1 wherein the molar proportion of said acetic anhydride to said phosphorous acid are mixed in a molar proportion of 1.3:1 to 1.5:1.

4. A continuous process according to claim 1 wherein the temperature of the reaction solution is in the range of 225° F. to 325° F.

5. A continuous process according to claim 1 which includes the step of continuously passing said reaction solution to a reaction zone with continuous stirring, said reaction zone comprising a constant volume back-mixing reaction system consisting of a plurality of reaction stages which together define a continuous system in which the amount of reaction solution continuously being added to said reaction zone is equal to the amount of reaction solution which is continuously being withdrawn from said reaction zone.

6. A continuous process according to claim 1 wherein the total average residence time within said reaction zone is from 5 minutes to 3 hours.

7. A continuous process according to claim 1 wherein the amount of water added to said withdrawn stream of said reaction solution is the theoretical amount of water necessary to split off all of the acetyl groups in said reaction solution, said amount of water being calculated by the formula:

$$(R-0.5)H_2O + H_3PO_3 + R(CH_3CO)O \rightarrow .5 \text{ ethane-}$$
$$1\text{-hydroxy-1,1-diphosphonic acid} + 2R - .5\ CH_3COOH$$

wherein R represents the number of moles of acetic anhydride per mole of phosphorous acid used in the reaction.

References Cited

UNITED STATES PATENTS

| 2,790,837 | 4/1957 | Robeson | 260—635 |
| 3,122,417 | 2/1964 | Blaser et al. | 260—500 |
| 3,202,579 | 8/1965 | Berth et al. | 260—500 |

FOREIGN PATENTS

| 1,148,551 | 5/1963 | Germany. |
| 978,297 | 12/1964 | Great Britain. |

OTHER REFERENCES

"Merck Index," 6th ed. (1952), p. 7, RS356M524.

LEON ZITVER, *Primary Examiner.*

J. E. EVANS, *Assistant Examiner.*